(12) United States Patent
Liljestrand (10) Patent No.: US 11,700,251 B1
(45) Date of Patent: Jul. 11, 2023

(54) MODIFICATION OF DEVICE BEHAVIOR FOR USE IN SECURE NETWORKING

(71) Applicant: Cyber Sonata, LLC, Sandia Park, NM (US)

(72) Inventor: Isaiah Liljestrand, Socorro, NM (US)

(73) Assignee: Cyber Sonata, LLC, Sandia Park, NM (US)

( * ) Notice: Subject to any disclaimer, the term of this patent is extended or adjusted under 35 U.S.C. 154(b) by 107 days.

(21) Appl. No.: 16/903,741

(22) Filed: Jun. 17, 2020

(51) Int. Cl.
*H04L 29/06* (2006.01)
*H04L 9/40* (2022.01)

(52) U.S. Cl.
CPC ...... *H04L 63/0876* (2013.01); *H04L 63/0428* (2013.01); *H04L 63/18* (2013.01); *H04L 2463/121* (2013.01)

(58) Field of Classification Search
CPC . H04L 63/0876; H04L 63/0428; H04L 63/18; H04L 2463/121
See application file for complete search history.

(56) References Cited

U.S. PATENT DOCUMENTS

| | | | |
|---|---|---|---|
| 10,439,817 B1 | 10/2019 | Choi et al. | |
| 10,541,996 B1 | 1/2020 | Choi et al. | |
| 2012/0124393 A1* | 5/2012 | Sethumadhavan | H04L 9/008 726/36 |
| 2015/0006601 A1* | 1/2015 | Aissi | H04L 63/0428 708/250 |
| 2017/0180327 A1* | 6/2017 | Levin | G06F 21/6218 |
| 2018/0373881 A1* | 12/2018 | Thom | H04L 9/30 |
| 2019/0116028 A1* | 4/2019 | Liu | H04L 9/3278 |
| 2019/0147078 A1* | 5/2019 | Dageville | G06F 21/602 707/695 |

OTHER PUBLICATIONS

Choi, Sung, et al., "Ephemeral Biometrics: What are they and what do they solve?", IEEE Intenational Carnahan Conference on Security Technology (ICCST), 2013.
Choi, Sung, et al., "Physically Unclonable Digital ID", IEEE International Conference on Mobile Services (MS), 2015.
Choi, Sung, et al., "Trustworthy Design Architecture: Cyber-Physical System", IAEA International Conference on Physical Protection of Nuclear Material and Nuclear Facilities, 2017.
Choi, Sung, et al., "Trustworthy Design Architecture: Cyber-Physical System", IEEE International Carnahan Conference on Security Technology (ICCST), 2017.

\* cited by examiner

*Primary Examiner* — Vance M Little
(74) *Attorney, Agent, or Firm* — Ortiz & Lopez, PLLC; Luis M. Ortiz; Kermit D. Lopez (57) ABSTRACT

A modifier infrastructure that takes digital device behaviors and allows them to enact channel behaviors instead. This infrastructure preferably extends to address issues of channels connected to channels for controlling and managing identities, privileges, and the encryption and decryption of valuable information. Embodiments of the present invention provide methods for computer authentication—particularly for component authentication, human-component authentication, and/or network cryptography.

14 Claims, 7 Drawing Sheets

MODIFICATION OF DEVICE BEHAVIOR FOR USE IN SECURE NETWORKING

BACKGROUND OF THE INVENTION

Embodiments of the present invention relate to computer authentication technology with specific focus towards component authentication, human-component authentication, and network cryptography.

The ability of users and devices to securely authenticate themselves to many parties is an everlasting struggle involving complicated passwords, certificates, key management, and hardware behavior. These different solutions often involve a give and take of flexibility and security.

One problem faced is the ability to uniquely identify a device or individual without the possibility of being able to simply steal keys, passwords or other static data in order to spoof the identity. One solution to this is the use of hardware that uses a specific behavior to authenticate, thus removing the need for static information. This type of hardware solution is known as physically unclonable function ("PUF") technology.

PUF technology works by authenticating a device to another device by running a challenge through it and getting a response unique to that device. From here, the challenge and response pair is run through an authenticating device that has the digitized version of the PUF function. This need to digitize the resulting behavior for later use mitigates much of the purpose of using unique hardware. The use of this technology as a generalized solution to cybersecurity problems is also limited in that the authentication must have one authenticating piece of hardware for each authentication channel.

The other primary limiting factor involved in PUF technology is reliance on hardware properties. This hardware is vulnerable to environmental factors that can render state changes that potentially corrupt the authenticating property therefore rendering the technology useless.

Similar to PUF in ability and application, digitally unclonable function ("DUF") technology—for example, as described in U.S. Pat. No. 10,541,996, enacts another form of challenge-response protocol to authenticate users. This is done by putting a digital device signature, user input, and dynamic data through a series of hash functions in tamper resistant hardware to produce an authentication token. This information is then sent to an authenticator which uses the same device signature, user input, and dynamic data to recreate the same authentication token proving that the sending entity is who they claim to be.

This technology is similar to PUF in its limitation of being a binary authentication system involving an authenticator and authenticating device. The necessary effort to initialize such an authentication channel is rather high with the need to be in possession of one securely set up tamper resistant hardware component per authentication route. This can be effective for use cases involving the need to authenticate themselves to only one other entity. However, this technology is generally not adequately equipped to deal with the highly complex and changing authentication infrastructures in modern society.

Some of the deficiencies of known DUF technology include:

1) DUF is established as a one-directional connection used only for authentication.
2) DUF technology lacks the ability to provide authentication and encryption communication movable in any direction and with any number of participants.
3) DUF requires that the same device signature and user input be established on both sides of an authentication connection. This requires the direct duplication of and usage of the device's behavior between devices.
4) DUF cannot be used with entities with different device IDs wherein user input is only known and used by the user to which that input corresponds. This is because DUF only works when the same user input and device ID are used and held by both participants.
5) Once a DUF device is established, the architecture involving this device and an authentication system is no longer flexible and thus cannot be changed to any other kind of architecture.
6) DUF lacks the ability to provide connections between any number of devices which can be subjected to all kinds of modifications involving addition of connections to new entities, deletions of existing connections, and regular updating of the necessary security infrastructure.
7) DUF utilizes a series of hash functions, requires the use of user input, and only one user input is discussed. DUF thus lacks the ability to provide flexible terms on user input or the algorithm used.

Some public key infrastructures ("PKI"), including Rivest-Shamir-Adleman ("RSA") and Elliptical Curve, are useful and widespread technology that are currently the primary mechanisms through which parties authenticate their identity to each other. Such infrastructures are used for all or almost all e-commerce, secure website domain interactions, cryptocurrencies, and much more. Public key infrastructure is built around asymmetric encryption, which uses a public and private key pair to securely authenticate oneself through the exclusive ownership of the private key. When a message is encrypted using the public key, only the private key can decrypt it and vice versa.

This utility often becomes cumbersome and complicated with the addition of certificates used to openly claim that a certain public key corresponds to a certain entity or domain. Additionally, one of the most significant drawbacks of this technology is its vulnerability to quantum computing. The security of asymmetric key pairs is derived from prime number factorization. Prime number factorization problems are theorized to be solvable in relatively small amounts of time with a sufficiently powerful quantum computer. While quantum computing has not been successfully implemented yet, there is significant effort put towards its development. When it is successfully implemented, public key infrastructure, as we know it, will become very vulnerable and therefore not viable for widespread use.

There is thus a present need for a system of authentication security similar to a PUF or DUF device while being capable of more flexible, adaptable usage required by modern authentication challenges. More particularly, there is a present need for a system that has the ability to authenticate to multiple entities and dynamically change authentication and encryption architecture on the fly with security practices comparable to PUF and DUF, and more particularly to provide solutions to problems typically solved using PKI, given the potentially limited lifespan of PKI technology.

BRIEF SUMMARY OF EMBODIMENTS OF THE PRESENT INVENTION

Embodiments of the present invention relate to a method for enabling a plurality of devices to securely communicate with one another, the method including creating a first channel by providing a first device, the first device including a first digital device behavior; modifying the first digital device behavior by entering first modifier data into the first device such that the first modifier data is acted on by the first device to produce a modified first digital device behavior; providing a second device, the second device including a second digital device behavior; and modifying the second digital device behavior by entering second modifier data into the second device such that the second modifier data is acted on by the second device to produce a modified second digital device behavior, entering data into the first device in the first channel and creating a first channel value for the first device; entering data into the second device in the first channel and creating a first channel value for the second device; and the first device sending encrypted data to the second device and the second device decrypting the encrypted data when the first channel value for the first device and the first channel value for the second device are the same. Providing a first device can include providing a first device with a first device ID and providing a second device can include providing a second device with a second device ID. Optionally, the first device ID and the second device ID are not equal. In one embodiment, at least one of the first device and/or the second device include a trusted component, which can optionally include a device ID. Entering data into the first device can include entering dynamic data. Optionally, the dynamic data can include a timestamp. Entering data can also include user input. Optionally, the first modifier data and the second modifier data are not equal to one another. The second device is preferably not provided the first device ID and the first device is preferably not provided the second device ID.

The method can also include creating a second channel by providing a third device, the third device including a third digital device behavior, modifying the third digital device behavior by entering third modifier data into the third device such that the third modifier data is acted on by the third device to produce a modified third digital device behavior, and modifying the second digital device behavior such that the second device and the third device share the second channel. The method can also include one or more of: chaining the first channel to the second channel such that the first device can communicate with the third device; connecting the first channel through a second channel with a second modifier; and/or encrypting at least one of the first modifier data or the second modifier data. Optionally, encrypting at least one of the first modifier data or the second modifier data can include encrypting at least one of the first modifier data or the second modifier data using user input and dynamic data.

An embodiment of the present invention also relates to a method for enabling a plurality of devices to securely communicate with one another, the method including creating a first channel between a first device and a trusted second device by providing the first device, the first device having a first digital device behavior; modifying the first digital device behavior by entering first modifier data into the first device such that the first modifier data is acted on by the first device to produce a modified first digital device behavior; providing the trusted second device, the trusted second device having a second digital device behavior; and modifying the trusted second digital device behavior by entering second modifier data into the trusted second device such that the second modifier data is acted on by the trusted second device to produce a modified trusted second digital device behavior; entering data into the first device in the first channel and creating a first channel value for the first device; entering data into the trusted second device in the first channel and creating a first channel value for the trusted second device; and the first device sending encrypted data to the trusted second device through the first channel and the trusted second device passing the encrypted data to a third device through a second channel. The method can also include forming a third channel directly between the first device and the third device such that communications between the first device and the third device occur directly through the third channel after it is formed and not through the first and second channels.

Embodiments of the present invention also relate to a method for securely connecting a person to one or more privileges, the method including assigning unique devices to a plurality of individuals, wherein each unique device is connected through a first channel which represents a unique individual's roll within an organization; each first channel further connected to one or more other channels which represent one or more privileges within the organization. Optionally, at least some of the one or more privileges are connected to one or more other privileges, controls, or data through a further channel. The person can be an employee and the organization can be a company.

Embodiments of the present invention also relate to a method for enabling a device to securely encrypt and/or decrypt data, the method including creating a first channel by providing the device, the device having a digital device behavior; and modifying the digital device behavior by entering modifier data into the device such that the modifier data is acted on by the device to produce a modified digital device behavior, entering data into the device in the first channel and creating a first channel value for the device; and the device decrypting encrypted data when the first channel value for the device matches a first channel value of an encrypting device which encrypted the encrypted data. The encrypting device can include a second device.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Embodiments of the present invention relate to a method and apparatus that enacts and modifies digital device behavior in order to enable a device to exhibit multiple behaviors without needing additional hardware. A device behavior can include an algorithm used to authenticate a device or individual through taking initialization parameters and passing them through a one-directional algorithm secured by embedded hardware to generate output for use in encryption or authentication.

This basic step of modifying a device's behavior allows for this security methodology to be used for setting up authentication channels between devices and enforcing various security infrastructures directly through device behaviors.

A modifier can include data that is mixed with other initialization factor(s) in order to change the output of a device behavior in a predictable manner. The result of using a modifier in conjunction with a digital device behavior ("DDB"), which is explained more fully below, is another, different DDB. Modifiers can be, but typically are not, stored in the trusted component used to enact a digital device's behavior algorithm, as they are intended to be utilized and manipulated outside of the trusted component for maximum flexibility and usability. In one embodiment, the trusted component can be a piece of hardware that stores the device ID and receives initialization factors from the device in order to run the behavior algorithm associated with the device. This can be embedded into the device, a removable part of the device, or an additional component or an additional device that is responsible for these tasks.

Embodiments of the present invention relate to the encryption of modifiers in order to prevent the bypassing of a device's default behavior. Still further, embodiments of the present invention relate to the use of modifier arithmetic to add and remove specific parties to and from an established channel.

Embodiments of the present invention relate to digital identity networking operations ("DINO"). DINO can include all device behaviors as well as operations involving one or more devices manipulating and making use of modifiers and channels.

A DDB can include but is not limited to an algorithm for initialization vectors which can include one or more of a device identification ("ID"); dynamic data that can optionally include a timestamp, user input, any number of modifiers (typically, the default behavior of a device uses no modifiers); and/or any other initialization factors including but not limited to environmental factors involving location; being mixed together in some fashion to form an input string to be run through an algorithm which itself can include but is not limited to a one-way cryptographic hash function. The output of such an algorithm preferably exists in such a way that multiple parties using a mixture of initialization factors that result in the same input string to the algorithm also result in the same output. If this property is somehow changed or neglected, other factors preferably come into play to enable the use of modifiers and channels. In one embodiment, most of the input parameters involved can be obfuscated or kept secret except the dynamic data. When a timestamp or any other form of dynamic data is used in order to authenticate or encrypt, it is preferable to send the message or store the encrypted data with the dynamic data used, because the receiving or decrypting behavior preferably uses the same dynamic data. It is also preferable that the same dynamic data never be used twice. Accordingly, a timestamp can be particularly desirable because the exact same date and time can never occur more than once.

When a behavior is used to encrypt something, a DDB preferably runs in order to generate an output used as a key of some encryption algorithm, typically being the advanced encryption standard. When used to authenticate, the behavior algorithm output itself can optionally be used to share the information such that one party is able to output the same behavior as the other party, which can be done in a variety of ways.

Default behavior preferably includes the DDB that is originally set up in a device. This behavior preferably includes but is not limited to a device ID, dynamic data, user input and any other initialization factors, which are optional, and which can include for example, a location. The default behavior of a device preferably does not utilize a modifier. Additionally, the default behavior of a device is preferably unique to the device and is preferably used for encryption and decryption of modifiers. The default behavior of a device can optionally be capable of being used as an encrypting or authenticating mechanism without a modifier, but this is preferably avoided as the default behavior of a device (without a modifier) most preferably remains unique to every device and is preferably not seen or shared.

A channel is preferably a modified device behavior. This applies to all DDBs that are not default behaviors. Because the DDB algorithm itself preferably remains the same for different devices, what preferably determines the behavior of the device is the combination of the input parameters and the device ID. In one embodiment, the DDB algorithm can be the device combining input parameters in a predefined manner, passing the resulting binary string to the trusted component which then performs an exclusive or logic operation ("XORs") this with the device ID and runs the resulting string through a cryptographic hash algorithm. The result of this hash algorithm is preferably then passed back to the device for use in encryption or authentication.

The following are a couple of examples of a DDB algorithm for two people:

Person A: Device ID:1010 User Input:0001 dynamic data:1100

Person B: Device ID:1001 User Input:1101 dynamic data:1100

When Person A runs the DDB algorithm with this, the resulting XOR after combing the input parameters with the device ID is 1010^0001^1100=0111

When Person B does the same, the result is 1001^1101^1100=1000

These are both put through the cryptographic hash function, which in this example, we will say results in person A receiving an output of 1001 and person B receiving an output of 1111. In this case, the outputs of persons A and B are different because their inputs were different, even though the same cryptographic hash function is preferably used for both persons A and B.

In another example,

Person A: Device ID:1010 User Input:0001 dynamic data:1100 modifier:1110

Person B: Device ID:1001 User Input:1101 dynamic data:1100 modifier:0001

When Person A runs the DDB algorithm with this, the resulting XOR after combing the input parameters with the device ID is 1010^0001^1100^1110=1001

When Person B does the same, the result is 1001^1101^1100^0001=1001

These are both put through the cryptographic hash function, which in this example we will say results in person A receiving an output of 1111 and person B also receiving an output of 1111. In this case, both A and B's outputs are the same because the same value was input into the same cryptographic hash function.

As illustrated in the foregoing examples, both the input parameters and the cryptographic hash algorithm preferably define the behavior of the device. However, the property of two or more devices being capable of ultimately outputting the same binary string from the hash algorithm even though they have different device IDs and different user input through the use of a modifier is the reason that encryption and authentication can occur. So, in one embodiment, one particular hash function can be used for all device behaviors and all of the differences in behaviors can be allowed to be defined by the differences in binary strings. Optionally, however, some synchronization of hash algorithms can be allowed—for example when two devices are 'paired' with each other, while keeping the hash algorithm itself part of a fluid system that is not tied to only one hash algorithm.

When used correctly with the intention of enacting a channel behavior, the input parameters preferably form a particular binary string known as the channel value. This binary string preferably only varies by the dynamic data or timestamp that are included. If no dynamic data or timestamp are used, the same binary string should result every time. Both of these principles apply regardless of the particular device enacting a channel behavior. When two or more devices are described as enacting the same behavior, it is implied that this same behavior on all of the involved devices is run through the same cryptographic hash algorithm. Otherwise, the resulting output would be different. Systems of multiple devices with device behaviors can exist such that all devices have one agreed upon and used hash function, so the input parameters are the only item that needs to be determined. Another way this can exist is with large systems of devices that are all capable of switching the behavior algorithm itself on the fly to whatever is needed and adapting to each other in order to use different algorithms for different behaviors/jobs.

When more than one device is connected to a channel, or connected to each other through a channel, there is preferably no assumption or implication that there exists any form of actual digital or physical connection between the 'connected' devices. Devices are said to be 'connected' when they both have the ability to exhibit a particular behavior.

In FIGS. 2-9, which describe various relationships, circles represent a device that enacts DDBs, squares represent channels, and arrows between them represent modifiers. Because modifiers are bidirectional in nature, a modifier pointing from one element to another denotes the ownership of that modifier by the pointing element, in order to modify its behavior to the pointed element. In diagrams describing processes (for example FIGS. 4, 8, and 9) solid lines denote modifiers established before the start of the process while dotted lines denote modifiers generated or calculated during the process. The solid and dotted line relationship applies the same way to channels.

User input behaviors are preferably not limited to any particular form. User inputs can optionally include, as non-limiting examples, one or more of usernames and passwords, only passwords, personal identification numbers ("pins"), fingerprints, facial recognition, and any other form of biometric or information authentication. Most preferably, user input provides the ability for successful user authentication by whatever means results in the exact same binary string to be used as input to the behavior algorithm. If the user input is off by even one bit, the algorithm will be enacting a slightly edited version of whatever behavior algorithm is being run which would result in failed encryption, decryption, or authentication.

DINO preferably involves a behavior algorithm for devices to enact, modifiers used to modify behaviors, and operations on modifiers and behaviors to achieve various cryptographic, private, and/or adaptability goals.

The basis of this invention from which everything else stems is the default behavior of a device. Of the devices being described here, each one preferably has its own unique default behavior. This default behavior preferably involves a tamper resistant hardware component, which is also referred to herein as a "trusted component" that does not include read capabilities. Each device preferably has a device ID which can include a long, randomly generated binary string that resides in the trusted component. When a device is initialized in order to enact DINO operations, the device ID is generated, stored on the trusted hardware and deleted from all locations except the device's trusted hardware component. During this initialization protocol, there may be a need to store the device ID with a trusted entity as a backup. However, this is usually an unnecessary measure that results in a potential for a security breach.

The default behavior of a device preferably enacts the following algorithm. Input parameters, involving dynamic data, user input (if set up to require user input), and any other input parameters involved except the device ID, are combined in some simple manner (such as XORing them together) to form one input string outside of the trusted component. This input string is then fed into the trusted component where it is mixed in some way (for example XOR) with the device ID. The result of this operation is then fed through an algorithm involving at least one cryptographic hash function. This algorithm can be extended to include any number of hashing steps, encrypting steps, and steps involving any other forms of mixing. Outside of requiring the usage of a hash function, the only other solid limitation of this step is preferably the need for every input to be mapped to exactly one output.

Outside of the encryption and decryption of modifiers, which is discussed later, the default behavior of a device is preferably not used by itself. Any authentication or encryption that takes place between DINO devices preferably takes place through the use of modifiers and channels.

The central piece of DINO that drives and enables everything else is the modifier. When a modifier is used along with the other input parameters that are present in the use of a default behavior, the algorithm preferably results in an alternative output. The new behavior that results in an alternative output is called a channel. There are two useful properties that modifier usage enables. The first being the ability to enact a different behavior than what is stored on the device while still utilizing the same security parameters that exist with the default behavior. The second advantage is the ability for devices with different default behaviors to utilize a shared alternative behavior.

Figure 1:
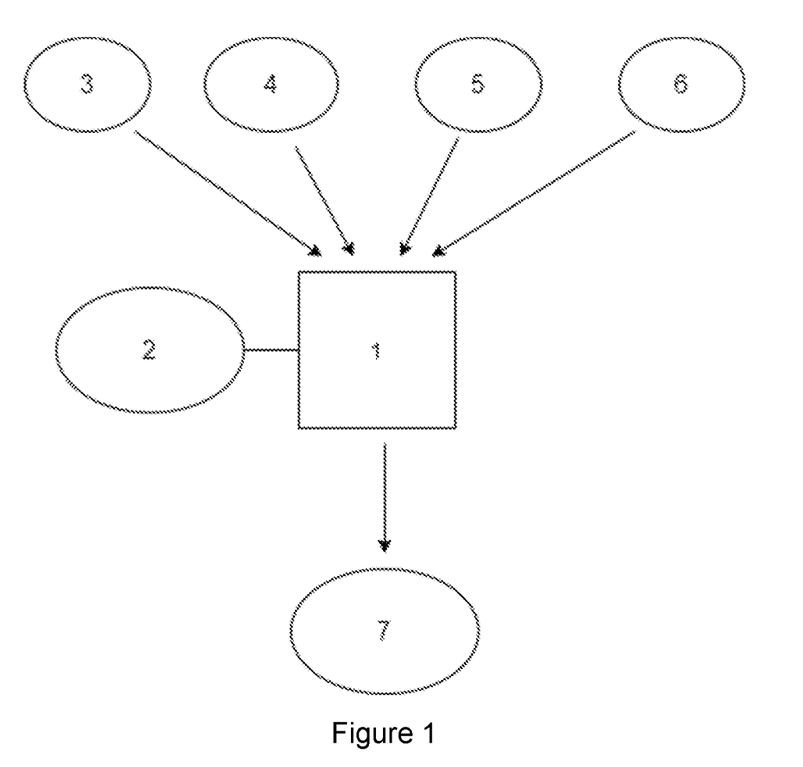
FIG. 1 is a drawing which illustrates digital device behavior utilizing a modifier for channel output.

In FIG. 1, the basic use of a modifier in conjunction with a default behavior is illustrated. As illustrated therein, trusted component 1 of the device is preferably responsible for enacting the default device behavior and holding device ID 2. The input parameters involved preferably include modifier 3, dynamic data 4, which can include a timestamp, optional user input 5, and other optional potential input parameters 6. These input parameters are passed into trusted hardware component 1, in order run the behavior algorithm. Once the algorithm is run, because a modifier was used, channel output 7 corresponding to the used modifier is preferably produced.

A modified device behavior or channel is capable of existing in two ways. The default way a channel is used is preferably in conjunction with one or more other DINO devices. This allows the devices involved to exclusively encrypt, decrypt and authenticate to each other by utilizing the behavior output. The second version of a channel is preferably one that belongs exclusively to one device. This can be used to encrypt information to be securely stored in a local or remote location. The main utility of using a channel in this form is the avoidance of using the original device behavior itself in situations where the original behavior is used for an alternative purpose or purposes and is to be kept isolated in its performance of such functionalities. Additionally, because the modifier and device are both necessary components of decryption and encryption to any particular channel, they can be stored separately in order to present further obstacles to the use of the channel involved.

While the DDB algorithm itself is not limited to any one particular algorithm, the target and simple case algorithm for which this applies can include a secure hash algorithm ("SHA") or Blake hash algorithm. For the sake of clearly communicating the architecture in its simplest form, the DDB algorithm is most preferably an XOR of all input parameters fed into SHA-256. When behaviors are described as being different, the behavior algorithm itself can be the same but the input parameters involved are different and through this, the output will adhere to a different behavior.

The following demonstrates one embodiment of an arithmetic relationship between the components involved in modified device behavior with no user input. Components involved can optionally include a device ID, timestamp, modifier, and channel. The operator used in this example is the XOR operator denoted by "^" due to its simple reversible properties. Other operators can be used in its place— particularly if they are reversible by the same operation or another (addition and subtraction for example). Assuming no user input is involved, the following describes the relationships involved. Input to default behavior=device ID^timestamp. Input to behavior modified to channel=device ID^timestamp ^ modifier. The timestamp is preferably additional input to every behavior calculation and does not need to be considered when calculating the relationships between device ID, channel, and modifier. Device ID=modifier^channel, modifier=device ID^channel, channel=device ID^modifier.

The addition of user input to the previously described algorithm can be present as part of inputs to both the default behavior as well as the channel behavior. Each behavior is preferably edited in such a way that the user input becomes necessary for that behavior to take place. For example, the device ID=Original device ID^user input. This way, the user input is necessary to use to produce the same behavior every time the algorithm is run. Assuming the same user input is necessary for both the original behavior and any channels to be enacted, editing the device ID to be offset by the user input is sufficient for all of them. However, different behaviors can add additional user inputs or simply use a different user input. This can be done by changing the modifier to be offset by either the additional user input or the additional user input^original user input. Offsetting by just the additional user input can require the user to use both user inputs as opposed to offsetting the modifier by both user inputs, which results in only needing to use the new user input. When modifiers are chained together, as is discussed later, each new modifier on a chain can present additional user input and is subject to the same properties as are described here in relation to other modifiers and the default behavior.

The user input side of this is rather flexible as one can introduce and require any number of user input parameters by offsetting the modifier or device ID in a necessary fashion. Most preferably, user input is handled in such a way that the resulting channel value remains the same when passed into the behavior algorithm. If the channel value is changed by incorrect or incorrectly set up user input while attempting to output a channel behavior, it cannot enact the desired behavior.

Figure 2:
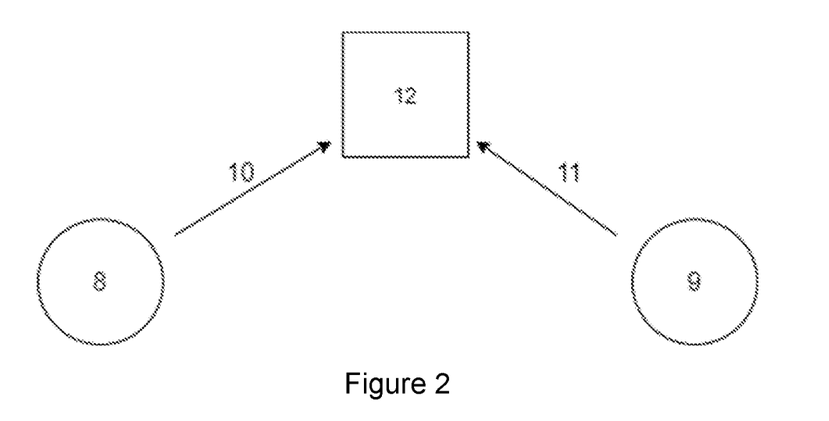
FIG. 2 is a drawing which illustrates two devices connecting to a mutually known channel.

The following demonstrates one embodiment of an arithmetic relationship that can be provided between the components involved in modified device behavior when two devices with different device IDs are set up to use the same channel with no user input involved. Referring now to FIG. 2, first device 8 is in possession of first modifier 10. Second device 9 is in possession of second modifier 11. Device ID of first device 8≠device ID of second device 9 and first modifier 10≠second modifier 11. Channel 12, is equal to device ID of first device 8^first modifier 10. Additionally, channel 12=device ID of second device 9^second modifier 11. The other arithmetic relationships involving device IDs, modifiers and channels that were previously stated, preferably also apply to the relationship between channel 12 and both first and second devices 8 and 9. When more than two devices are participants in a channel, the previously stated relationships between each device and the shared channel preferably apply to every participating device.

Figure 3:
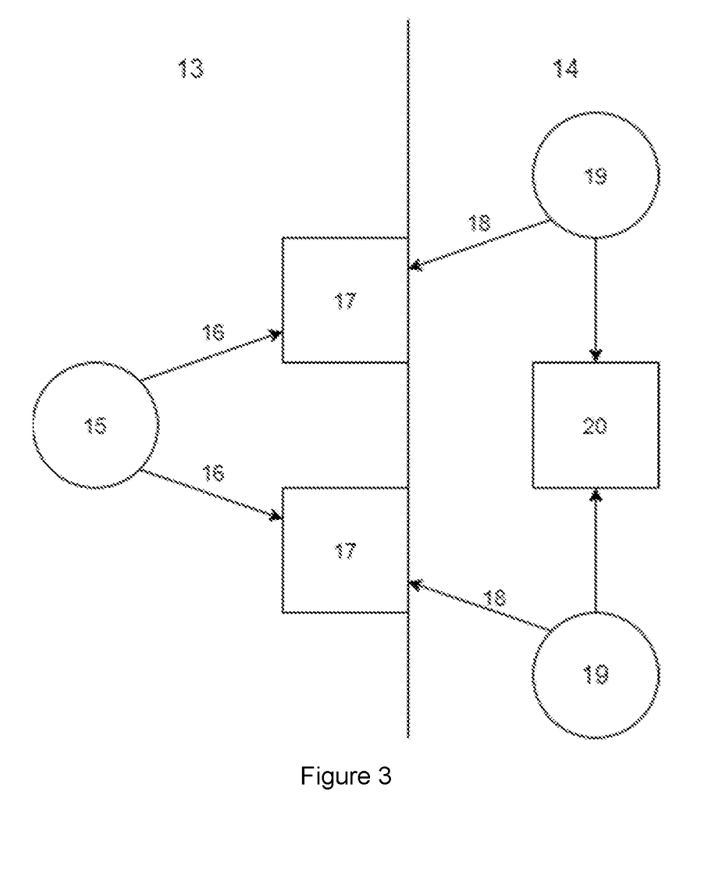
FIG. 3 is a drawing which illustrates identity isolation.

Identity isolation is preferably accomplished by requiring devices to communicate via channels with no exchange or knowledge of device IDs. This relationship is illustrated in FIG. 3. In a case where a device ID of compromised device 15 is exposed when using channels to communicate between devices, only the channel values can potentially be exposed. The full compromise of this device, while being in possession of compromised modifiers 16, compromises the privacy of channels 17 connected to the compromised device. All of these compromised components fall under compromised section 13. This is opposed to uncompromised section 14, which holds all uncompromised elements of the diagram. As illustrated, the compromise of the victim device, has no effect on the compromise of connected devices 19, or their modifiers 18. This way, uncompromised devices 19, and their channel 20, remain untouched. In a situation where modifiers are not used, the device IDs on connected devices would have to be the same, and compromising one device ID compromises every connected device leaving all connected devices with the burden of needing to re-initialize and reconnect to all lost connections.

While it is usually advantageous to use channels for communication purposes due to identity isolation and separation of communication routes, another potentially useful application of modifiers is the use of a modifier to allow one device to clone the behavior of another device. For example, in order for a first device to clone the behavior of a second device, second device ID=first device ID^modifier. With the modifier in possession of the first device, there is the potential to exhibit authority over the second device.

Figure 4:
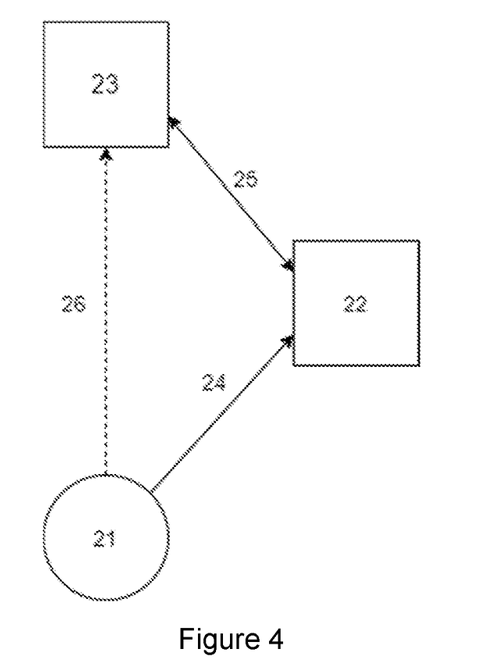
FIG. 4 is a drawing which illustrates chaining modifiers.

Another useful quality of modifiers is the ability to chain them to reach different channels and calculate new modifiers to connect previously unconnected behaviors. FIG. 4 illustrates a depiction of device 21 connected to first channel 22 which is connected to second channel 23. Device 21 is connected via first modifier 24 to first channel 22. First channel 22 is connected through second modifier 25 to second channel 23. The modifier between the device and second channel 23—for example third modifier 26 is not instantiated and does not initially exist. Because of the arithmetic relationships between modifiers, channels and devices, the XOR of a string of modifiers from point A to point B results in a new modifier that connects point A and B directly. In FIG. 4, this means that in order to create/calculate third modifier 26, device 21 must calculate first modifier 24 XOR second modifier 25. As long as this information is known, in order to modify its default behavior to second channel 23, device 21 must either XOR these two modifiers together every time or store the result of that operation to directly connect to second channel 23 at any time. As stated previously, because modifiers can be used to clone the behaviors of another device, this chaining of modifiers is not limited to channel-to-channel chaining. This chaining can take part with any number of intervening channels and/or devices.

Figure 5:
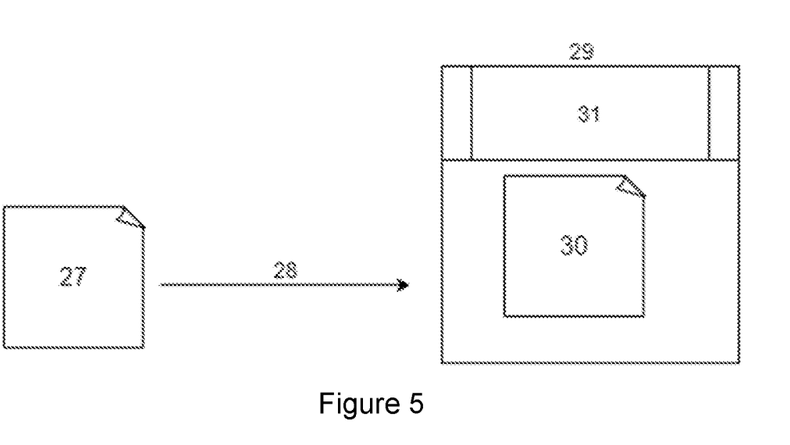
FIG. 5 is a drawing which illustrates keyless encryption storage.

The ability to encrypt and store information by utilizing a particular modifier is a useful application of a device behavior. As illustrated in FIG. 5, a behavior can be used to encrypt information for secure storage. This encryption can be done with the default behavior of a device as well as with a channel. In situations where this would occur, the timestamp or other dynamic data and the encrypted information would typically be stored together for future use. Depending on the particular relationship of the modifier to the encrypting device, the modifier can also optionally be stored in this metadata. FIG. 5 illustrates file 27 to be encrypted and stored for future use. A default or modified device behavior 28 is enacted in order to create a key and then use that key to encrypt file 27. This allows for the encrypted information to be only usable or decrypted by the device used to encrypt it. This behaves in a similar fashion whether the default behavior or a channel is used to encrypt the information. The main difference being whether the use of the default behavior for other purposes has the potential to uncover the key used for the encrypted file. The packaged result 29 of the encryption preferably involves encrypted file 30 and file metadata 31. The metadata involved preferably holds at least the timestamp or other dynamic data that was used to encrypt the file. Additionally, the metadata can potentially contain the modifier(s) used to encrypt it if there were any, identifying information pertaining to the encrypting device or behavior, and any metadata necessary for identifying or pertaining to the encrypted file. Enough information is preferably available to allow for the encrypting entity to be capable of decrypting it later.

The security of a DDB relies on keeping the device ID secure and out of touch in separate unreadable hardware. However, the knowledge of a modifier and channel value can be used to recalculate the device ID. Because of this security issue, if the channel value is ever instantiated for any reason, it is preferable that it be deleted so that it cannot be used maliciously. As long as the channel value is always deleted or never instantiated in the first place, the only way to utilize the channel is by running the modifier through the specialized hardware's behavior algorithm, which is the goal.

There are a few distinct vulnerabilities present in this protocol that would potentially allow a remote, malicious party to compromise a user. The device ID is secure and unreadable in hardware that exists in every user's possession; this is a significant point of security as it cannot be stolen via remote means. The only two ways to use this against a user directly are through the physical theft of the device or the complete remote takeover of the victim's device. Both of these methods still leave the device ID value itself untouched and unknown. In one embodiment, modifiers do not, however, have the same security parameters of being stored in unreadable hardware. These can be used and stored by any means fit to the activity the modifier exists for. This creates the potential of either the recalculating of the device ID through the use of a mutual channel or the potential for a bypass attack.

The recalculating of the device ID can take place given that a remote party has connected to the victim device through a channel and stolen the victim's modifier. Using their own device along with their modifier and the stolen modifier, the remote party has the potential to clone the victim's default behavior. In this scenario, if the victim secures the behavior with user input, the behavior is still relatively secure as the attacking party would require the victim's input in order to do any damage. To take this attack a step further though, the attacking party can physically compromise their own device to uncover their device ID and use this along with the two modifiers in their possession to recalculate the victim's device ID.

A bypass attack is an attack that does not target the victim's device ID itself but rather the channels the victim's device is connected to. If a malicious party can steal all of the victim's modifiers and themselves be connected to a mutual channel with the victim, they can XOR the victim's modifier that connects to their channel with one of the other victim's modifiers in order to connect directly with another one of the victim's channels. Assuming only one piece of user input is involved, this also eliminates the need for the malicious party to learn the victim's user input as the two modifiers XORed together ultimately cancel out the device ID and user input, leaving a direct connection between the two connected channels usable by the malicious party. The use of different user inputs for different channels presents a serious barrier to this attack; however, the hardware advantage and secure communication protocols are reduced to only the security of user input, which always has the potential to be compromised.

Figure 6:
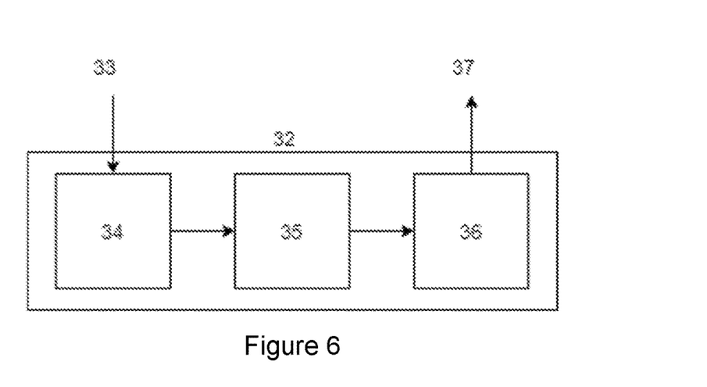
FIG. 6 is a drawing which illustrates modifier encryption processing according to an embodiment of the present invention.

The presence of these two vulnerabilities introduces a need to secure modifiers to prevent these types of attacks. Embodiments of the present invention preferably involve the use of either the same piece of hardware or an additional piece of hardware in order to encrypt and decrypt modifiers with their usage. This ability is illustrated in FIG. 6. Embodiments of the present invention can involve either just the original piece of hardware responsible for running the behavior algorithm or the previously mentioned piece of hardware working in tandem with hardware responsible for encryption and decryption of modifiers. The rectangle involved preferably represents a single piece of hardware or two pieces of hardware working together 32. To initiate the use of a channel behavior, input parameters 33 are preferably passed into the hardware being used. The input parameters 33 can include information that includes an encrypted modifier, the timestamp or other dynamic data that the modifier was encrypted with, user input, a timestamp or other dynamic data with which to enact the DDB being dealt with, and any other additional input parameters necessary to enact the behaviors being dealt with. The first process 34 preferably includes decrypting the modifier by enacting the default device behavior using the timestamp passed in. The newly decrypted modifier is then passed to the modified device behavior enactment 35, which preferably enacts the behavior that uses the decrypted modifier along with the timestamp or other dynamic data intended for this transaction. Finally, the re-encrypting process 36 preferably takes place, which simply re-encrypts the modifier with a new timestamp. This whole process creates outputs 37 which preferably include the channel output associated with the modifier used as well as the re-encrypted modifier. The old modifier is preferably then erased and replaced with the new one stored with the timestamp or other dynamic data associated with its encryption. The details of this encounter can vary with the type of user input involved and whether there are multiple user input factors to take into account. The timestamps involved can also be flexible, as the channel output and modifier can be accomplished using the same timestamp or use different timestamps for each one. Finally, the default mode for this to take place is preferably the default device behavior to be responsible for the encryption and decryption of the modifiers involved. This is also not necessarily the case, as encrypting modifiers to a channel for decryption and re-usage by other devices may be advantageous. This may take additional steps to secure and use additional modifiers that do use the default device behavior for encryption, but the core of this is the use of the behaviors to decrypt and re-encrypt modifiers as they are used. This way modifiers are no longer a liability to the security of the architecture while still preserving functionality.

The need for this encryption of modifiers can complicate the transfer of modifiers between devices sharing new connections. This can be remedied by transferring modifiers to others by leaving them encrypted between trusted components. In one embodiment, the default way to transfer encrypted information is preferably by creating an encryption key through a mutually known channel by the sender while the receiver simply runs the same behavior to decrypt. Instead of transferring modifiers in this way, an additional security precaution can be taken to prevent the exposure of the modifier at any point in this process. This is preferably done by taking the encrypted modifier as well as the modifier responsible for the mutual channel and using these in a similar fashion to how modifiers are normally decrypted and encrypted with the exception being that after being decrypted, the modifier is preferably re-encrypted by the mutual channel behavior rather than the default behavior. Upon reception of the encrypted modifier, the same process preferably takes place in reverse in the receiver's device. While this transaction is not essential, it does provide the ability of never having to hold unencrypted modifier outside of the trusted hardware component.

Figure 7:
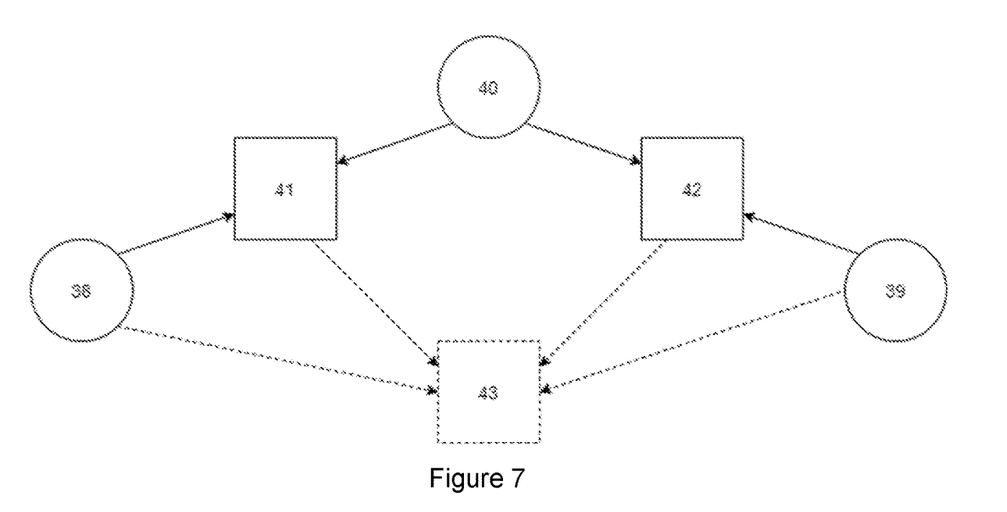
FIGS. 7 and 8 are drawings which respectively illustrate channel creation through trusted third party and channel creation through a distributed trust network according to embodiments of the present invention.

Unfortunately, it can be problematic to create new connections in a secure manner as creating and calculating channel and modifier values has the potential to uncover a device ID, or may need to use the device ID in order to calculate a modifier from a channel value. Due to the possible security issues of doing this, devices can be connected through a mutually trusted third party with no need for calculations involving device IDs or exposure of confidential information. As illustrated in FIG. 7, two previously unconnected devices (first device 38 and third device 39) become connected to each other through new channel 43 through the use of trusted second device 40. First device 38 and second device 40 are preferably connected through first channel 41, while third device 39 and second device 40 are preferably connected through second channel 42. All communication that takes place during this process preferably takes place through encrypted messaging using first channel 41 and second channel 42. Third channel 43 and all modifiers connecting to it do not exist at the beginning of this process. To start, one of the devices involved generates a preferably random number to be used as a modifier to connect either first channel 41 or second channel 42 to the, unknown and/or new, third channel 43. Through this process, the actual channel value of new third channel 43 is never actually instantiated or calculated by any devices involved. Because first channel 41 and second channel 42 should not be known either, the new third channel 43 is treated as an entity that only exists through a connection of an unknown value to a new unknown value. Assuming the value was instantiated to connect first channel 41 to new third channel 43 between first device 38 and second device 40, whichever device instantiated the value preferably sends it to the other so that both are in possession of it. From here, second device 40 preferably calculates the modifier that connects second channel 42 to third channel 43. This can optionally be done through the XOR of modifiers connecting the following pairs: first channel 41 to third channel 43, second device 40 to first channel 41, and second device 40 to second channel 42. Second device 40 then preferably sends the modifier connecting second channel 42 and third channel 43 to new third device 39. From here, all parties are now capable of using third channel 43. First device 38 and third device 39 can now connect directly to third channel 43 through the XOR of the two modifiers in their possessions. The unfortunate side effect is the ability of the third party to hold onto this connection to third channel 43 and use it for spying or mimicking users. In order for this to happen property, once this process is finished, the trusted third party preferably disposes the modifiers connecting to third channel 43 in its possession.

Figure 8:
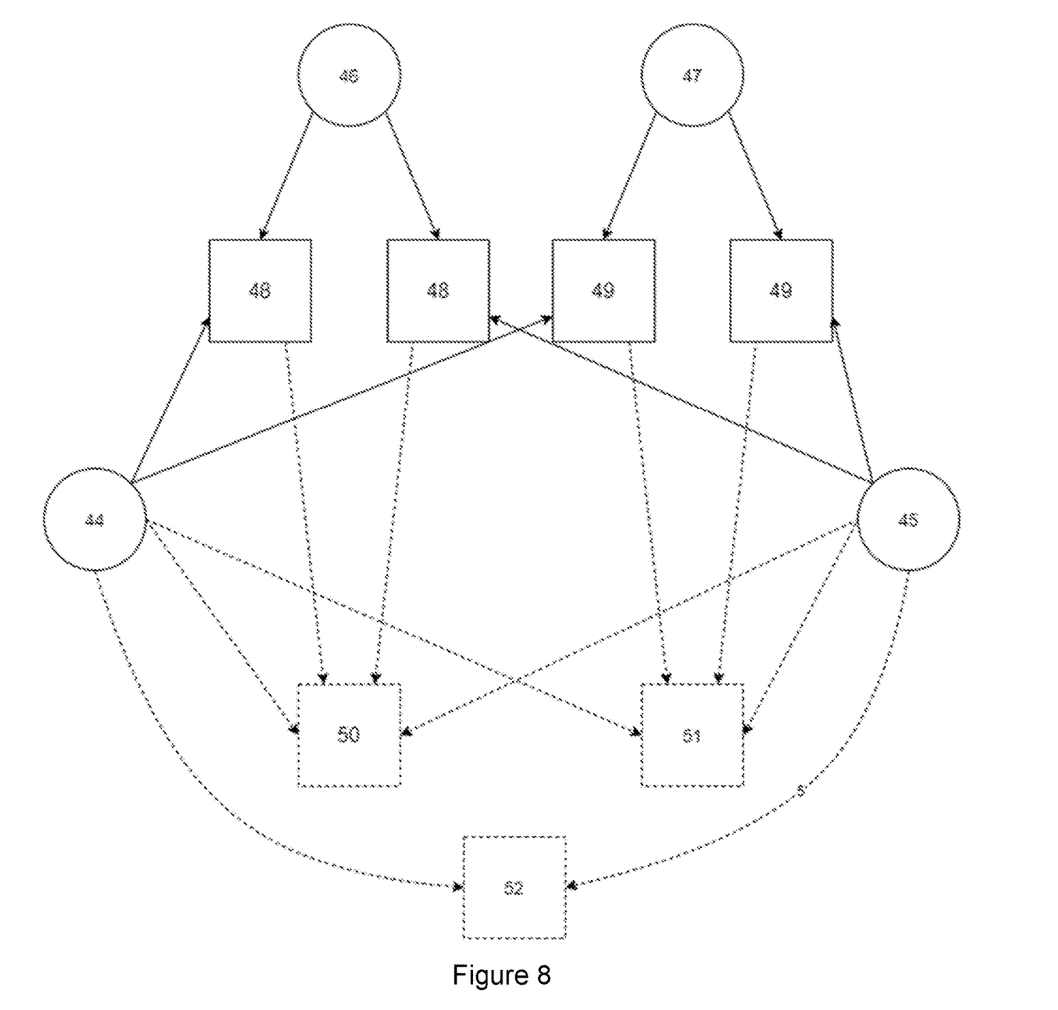

Due to the need for devices to securely connect to each other without having to meet physically or responsibly exchange information, connecting devices through another party is a very important and useful utility. However, the need of a trusted third party to throw away their connection information every time this service is used leaves a dangerous amount of power in the hands of the connecting party. One solution to this is the use of a distributed trust network responsible for connecting devices to each other through new channels. This process of connecting through a trust network is illustrated in FIG. 8. As illustrated therein, first device 44 and second device 45 wish to connect to each other and agree to use third device 46 and fourth device 47 as their distributed trust network. First device 44 and second device 45 each have pre-existing connections 48 and 49 with both third device 46 and fourth device 47 and use them to securely exchange information. First device 44 and second device 45 preferably run the algorithm described in the previous paragraph and as illustrated in FIG. 7 using third device 46 as their trusted third party, thus resulting in new first channel 50. First device 44 and second device 45 then preferably do the same thing with fourth device 47 as their trusted third party, thus resulting in second channel 51. Now, first device 44 and second device 45 preferably both take the XOR, or other desired mixing formula, of their modifiers, thus leading them to first channel 50 and second channel 51.

The resulting modifiers are then used as a direct link from first device 44 and second device 45 to another new channel, (for example third channel 52). Now, third device 46 cannot use or see third channel 52. Fourth device 47 is also incapable of using third channel 50. Only by working together or by both being compromised is anyone, other than first device 44 and second device 45, able to use third channel 52. This same principle can optionally be scaled up to any desired number of connecting parties in order to distribute the trust of throwing away modifiers once connections have been established. If there are five connecting parties in a distributed trust network, as long as at least one of them acts faithfully and throws away their modifiers without being compromised, devices requesting a connection are successfully set up to communicate privately from the connecting parties. Additionally, if there are 4 servers responsible for all new connections, and one gets hacked or taken down by other means, users are still able to establish connections using the remaining three servers unhindered.

Connecting devices can be difficult to initiate and may not always have connecting third parties at the disposal of the users. Connecting two devices without a trusted third party has the potential of exposing the channel value involved; however, if performed correctly, this does not create other vulnerabilities. In order to connect two devices directly, a channel value is preferably instantiated and then shared with both devices. The channel value is then preferably sent to the trusted hardware component. The trusted hardware component then preferably generates a modifier value from the channel value, encrypts it by running the default behavior algorithm to get a key, and then returns the encrypted modifier to the controlling device. From here, the channel value is preferably deleted from both devices so as not to potentially uncover the shared secret. Both parties have a vested interest in deleting the channel value at the end of this transaction, so as long as the medium through which the channel value is distributed is secure (once initialization is done), involved devices are completely secure for the foreseeable future. This interaction can optionally be performed physically in person, through particularly secure lines, or through the use of a Diffie-Hellman key exchange.

Utilizing the addition of devices to a channel as well as the chaining of connections to enable different infrastructures, channels can optionally be used to control and create user or group identities. For example, if a user has a phone, computer and tablet and wishes to authenticate themselves to a bank as an individual rather than individually from each device, this user can optionally create a channel that each device is connected to and ultimately create, manage, delete, and use connections rooting from this shared channel, rather than from individual device behaviors. This enables shared authentication and communication to happen more seamlessly between devices that still hold separate device IDs. This can also be expanded to represent groups or families. By taking multiple people belonging to a group, each with an identity controlling channel, a group channel can optionally be created and connected to by each of these individuals. This group channel is then responsible for managing the group identity.

Role-based access control infrastructure can optionally be enforced via channel interactions. As described in the previous paragraph, channels can be capable of being used to describe a particular group. In the same way, channels can also be safeguards to information, privileges, and controls. By creating channels that describe each position in a company, as well as channels that protect each individual privilege or control, every company position channel can optionally be mapped to its corresponding privileges or controls. Beyond the need for every employee to be successfully mapped to their company position, the company itself is then responsible for managing and making public the necessary modifiers. Each modifier is preferably kept encrypted via the behavior of the position it attaches to. By doing this, all employees in the company are only able to use the modifiers relevant to their role. The management of responsibilities can then be kept separate from all employee hardware, key, or identification.

Figure 9:
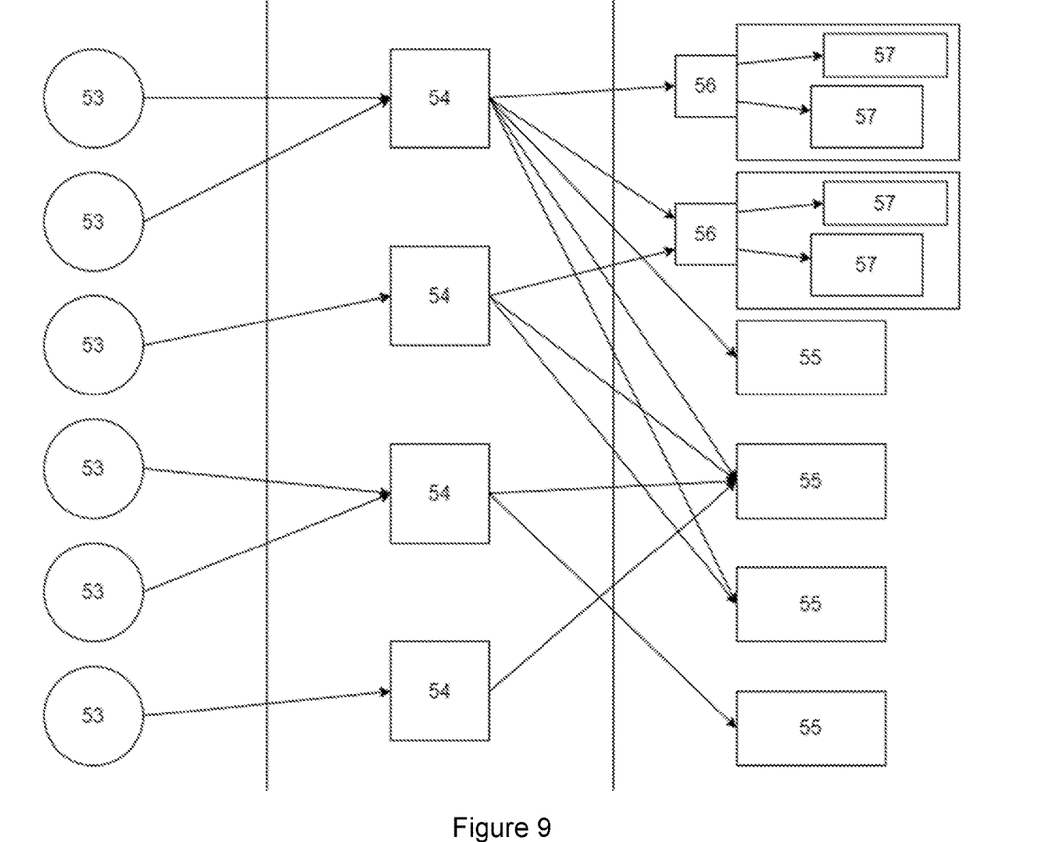
FIG. 9 is a drawing which illustrates a role-based access control infrastructure enforced through channels.

FIG. 9 illustrates an embodiment of previously-described role-based access control infrastructure. In this embodiment, each of employee devices 53 preferably describe a corresponding one of the employees who each have a device capable of enacting DDB behaviors. Each of these employees is also preferably connected to one of role channels 54, each of which represent their role in the company. Finally, each of the roles preferably connects to any number of privilege or control channels 55. In some situations, roles can be connected to one or more of privilege channels 56 which connect to further privileges, controls, or data 57. This infrastructure is also not limited to the device to role to privilege configuration that is illustrated in FIG. 9. Rather, roles can optionally connect to lower privilege roles instead of connecting directly to certain privileges. One can also simply request resources or privileges by sending in one's role behavior output as proof of role, rather than mapping directly to privilege channels. This infrastructure has significant potential to assist with abstraction and management of company roles and privileges.

The existence of protocols, for example those involving either individual or distributed connecting third parties and role-based access control infrastructure, preferably allow for alternative methods for secure initialization of DINO devices. When a device is initialized with a default behavior, additional steps are preferably taken in order for it to be connected to others while not sharing the device ID. In a situation where a device ID is made and set up with no additional steps, connecting this device to others would be practically impossible as the device ID is out of reach, thus leaving no route to create its first connection. However, if at least one connection is made during the initialization of a device, further connections can be established through the previously discussed architectures and operations.

The previously discussed necessity provides the necessity of connecting newly initialized devices to at least one trusted, secure entity through which to continue to connect to additional parties to grow one's network. In practice this can optionally be done through the use of a centralized authority that is responsible for the establishment of a device in a wider network of devices and channels.

INDUSTRIAL APPLICABILITY

Embodiments of the present invention are further illustrated by the non-limiting examples which follow.

Example 1

Figure 10:
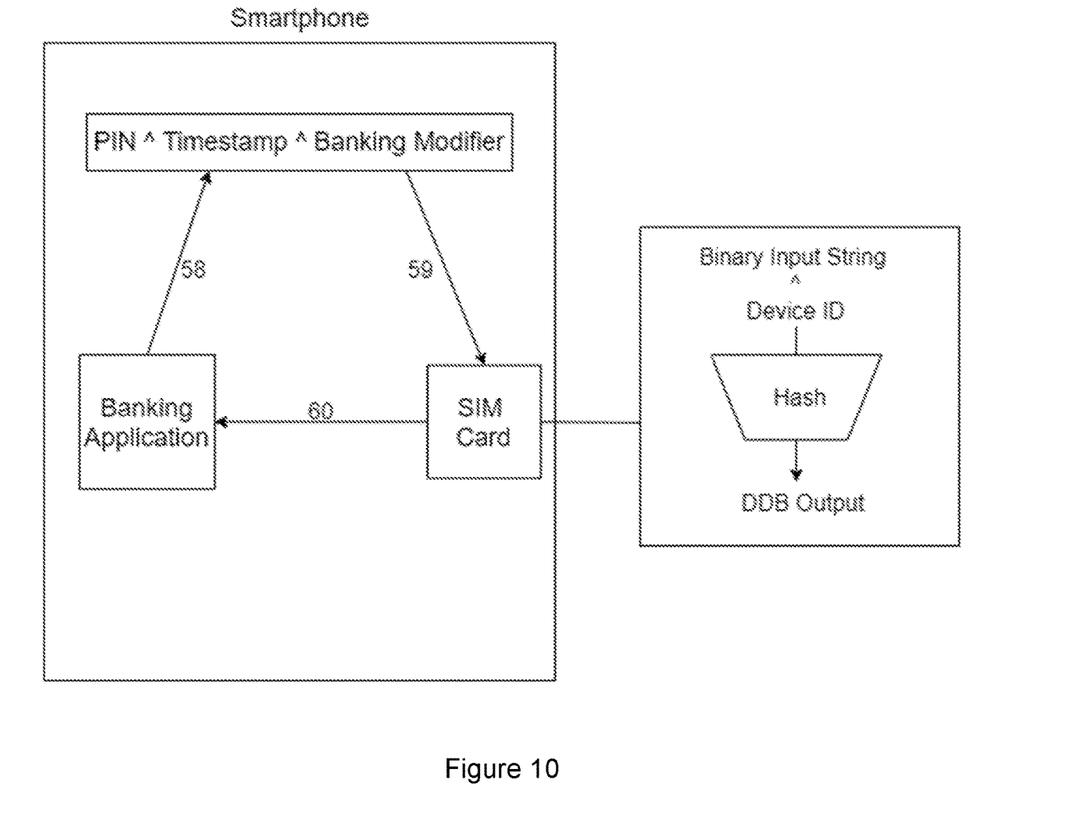
FIG. 10 is a drawing which illustrates an example wherein an embodiment of the present invention is used in conjunction with a smartphone.

An embodiment of the present invention can be the use of DINO for smartphones that utilize a subscriber identity module ("SIM") card for communication with trusted third parties, which can include for example banking, secure messaging, secure access to home or work infrastructure, secure cloud storage, combinations thereof, and the like. This can be expanded to be used for any service that requires encryption, decryption, authentication, or the accomplishment of other, similar cryptographic objectives that can be used by smartphones in any capacity. FIG. 10 illustrates the relationship between a smartphone, SIM card and the use of a device behavior to interface with a banking application. In order to securely communicate with a bank through the use of the banking application, the banking application preferably holds a modifier for use with the bank. The banking application then passes 58 this modifier to a process responsible for initializing the smartphone's behavior algorithm. The smartphone then collects the user's PIN, if necessary, and XORs the PIN, timestamp and banking modifier in order to get an input string to feed into 59 the SIM card. The SIM card takes the input string, and XORs it with the locally stored device ID in order to feed it though the cryptographic hash function the SIM card is programed to perform. The result of this operation is then passed back 60 to the banking application to be used as a session key for secure, encrypted communication with the bank. The first encrypted message to the bank comes with a timestamp that must be used by the bank to generate the session key on the other side. A similar process then takes place in some capacity on the bank servers/hardware allowing it to recreate the same session key from the timestamp used. This same process is available for however many applications intend on leveraging this security measure that is already well set up to support the phone.

Example 2

An embodiment of the present invention can be used to securely store cyber assets, which can optionally include bitcoin private keys. Any generic device can be enabled to use different modifiers for each category of information and use different user input, depending on the value of information. For example, one user can use a very long complex password to encrypt cryptocurrency assets and only use a small 4-digit PIN number to securely store harmless files. Using new connections, third parties, identity management, and direct channel establishment, can manage cryptocurrency assets between multiple devices, enable new devices to interface with the cryptocurrency and can share these assets with trusted parties.

Example 3

Public key infrastructure is an incredibly useful widespread technology that has enabled significant security and privacy to individuals and companies over many years. Unfortunately, with the threat of quantum computing, it may not be a viable solution to many problems for very long. The use of device behaviors enhanced with modifiers has properties that can ultimately create an alternative solution to generalized public key infrastructure. Because of the symmetric quality of device behavior algorithms, they are not very well equipped to handle the equivalent of the use of a private key to publicly authenticate oneself to unlimited other parties. What DINO infrastructure is very effective at is the establishment of new, secure one-on-one connections. Through the use of a centralized or decentralized DINO authority, entities are capable of requesting new connections with other users or companies. Once a connection with any particular party is established, the connected entities are set up to securely connect moving forward, without the use of external resources. Every session can be initialized with verification of both parties through the exchange of outputs of the mutual channel followed by a secure establishment of a session key. Embodiments of the present invention can thus replace secure sockets layer ("SSL") and/or transport layer security ("TLS") protocols.

Example 4

Army communication protocols have potential to benefit from the flexible nature of modified device behaviors that are provided by embodiments of the present invention. Adding new soldiers to previously established channels as well as cutting out compromised devices can be done in a quick fluid manner given proper protocols and authority of individuals and/or devices.

Example 5

Embodiments of the present invention can provide secure access for vehicles. Through the use of phone or key fob device behavior to authenticate oneself to open a car, embodiments of the present invention can be customized to use whatever user input is needed or desired for such applications. Embodiments of the present invention provide the security of physically needing the key fob or cell phone that is configured with these capabilities to access the vehicle. One can also configure a key fob or phone to unlock or control any number of cars through the use of channel values associated with each car. The ability to transfer control of these functionalities to another trusted user is yet another useful application for embodiments of the present invention. Embodiments of the present invention can permit the grant of access with a time limit, grant usage that is limited in some other attribute, or can simply grant full privileges to a trusted family member if it is deemed necessary.

The preceding examples can be repeated with similar success by substituting the generically or specifically described components and/or operating conditions of embodiments of the present invention for those used in the preceding examples.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), or the like, in conjunction with appropriate memory, network, and bus elements. One or more processors and/or microcontrollers can operate via instructions of the computer code and the software is preferably stored on one or more tangible non-transitive memory-storage devices.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A method for enabling a plurality of devices to establish secure communication with one another via a channel behavior, the method comprising:
    providing a first device, the first device comprising a first digital device behavior;
        the first device having a first modifier value;
        the first digital device behavior and the first modifier value acted on by an exclusive OR logic operation to produce a channel value;
        the first device sharing the channel value with a second device via a trusted third party;
    the second device comprising a second digital device behavior;
        the second digital device behavior and the channel value acted on by an exclusive OR logic operation to produce a second modifier value;
        the second modifier value stored on the second device;
    passing input data through a digital identity networking operation that includes the channel behavior to generate a cryptographic hash function to securely communicate between the first and the second device;
        the first device sending encrypted data to the second device and the second device decrypting the encrypted data using the channel behavior; and
    creating a second channel behavior by:
        providing a third device, the third device comprising a third digital device behavior;
        applying an exclusive OR operation on the first digital device behavior with a modifier value that is different from the first modifier value to produce a second channel value;
        the first device sharing the second channel value with the third device; and
        applying an exclusive OR operation on the third digital device behavior of the third device and the second channel value to produce a third modifier value; and
        entering data into the first device and performing encryption with an encryption key that was generated using the second channel.

2. The method of claim 1 wherein providing a first device comprises providing a first device with a first device ID and wherein providing a second device comprises providing a second device with a second device ID.

3. The method of claim 2 wherein the first device ID and the second device ID are not equal.

4. The method of claim 2 wherein the second device is not provided the first device ID and wherein the first device is not provided the second device ID.

5. The method of claim 1 wherein at least one of the first device and the second device comprise a trusted component.

6. The method of claim 5 wherein the trusted component comprises a device ID.

7. The method of claim 1 further comprising entering dynamic data into the first device.

8. The method of claim 7 wherein the dynamic data comprises a timestamp.

9. The method of claim 8 further comprising entering user input into the first device.

10. The method of claim 1 wherein the first modifier value and the second modifier value are not equal to one another.

11. The method of claim 1 further comprising chaining the first channel to the second channel such that the first device can communicate with the third device.

12. The method of claim 1 further comprising encrypting at least one of the first modifier value or the second modifier value.

13. The method of claim 12 wherein encrypting at least one of the first modifier value or the second modifier value comprises encrypting at least one of the first modifier value or the second modifier value using user input and dynamic data.

14. A method for enabling a plurality of devices to securely communicate with one another comprising:
    creating a first channel between a first device and a second device by:
        applying an exclusive OR operation on a first digital device behavior of the first device with a first modifier value to produce a modified first digital device behavior;
        applying an exclusive OR operation on a second digital device behavior of the second device with a second modifier value to produce a modified second digital device behavior;
    entering data into the first device and performing encryption with an encryption key that was generated using the first channel;
    transmitting encrypted data from the first device to the second device;
    creating a second channel between the first device and a third device by:
        applying an exclusive OR operation on the first digital device behavior with a modifier value that is different from the first modifier value to produce a second channel value;
        the first device sharing the second channel value with the third device; and
        applying an exclusive OR operation on a third digital device behavior of the third device and the second channel value to produce a third modifier value; and
    entering data into the first device and performing encryption with an encryption key that was generated using the second channel.

* * * * *